United States Patent
Basu et al.

(10) Patent No.: US 6,219,539 B1
(45) Date of Patent: *Apr. 17, 2001

(54) SYSTEMS AND METHODS FOR IMPLEMENTING PRIVATE WIRELESS COMMUNICATIONS

(75) Inventors: Kalyan Basu; Girish Patel; Chenhong Huang, all of Plano, TX (US)

(73) Assignee: Nortel Networks Corporation, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,828

(22) Filed: Apr. 8, 1997

(51) Int. Cl.[7] ........................................ H04Q 7/20
(52) U.S. Cl. .......................................... 455/417
(58) Field of Search .................... 455/422, 417, 455/426, 432, 510, 553, 566, 561; 370/342

(56) References Cited

U.S. PATENT DOCUMENTS

| 5,504,803 | 4/1996 | Yamada et al. | 379/59 |
| 5,594,782 | * 1/1997 | Zicker et al. | 455/417 |
| 5,754,542 | * 5/1998 | Ault et al. | 370/342 |
| 5,812,955 | * 9/1998 | Dent et al. | 455/561 |
| 5,911,120 | * 6/1999 | Jarett et al. | 455/417 |

FOREIGN PATENT DOCUMENTS

| 95/23488 | 8/1995 | (WO) . |
| 97/05753 | 2/1997 | (WO) . |
| 97/09835 | 3/1997 | (WO) . |

* cited by examiner

*Primary Examiner*—William Cumming
(74) *Attorney, Agent, or Firm*—Carr & Storm, L. L. P.

(57) ABSTRACT

A communications system includes a dual mode mobile station and a home base station. Dual mode mobile station is operable selectively in CDMA and analog modes. Home base station includes circuitry for establishing wireless communications with mobile station in the analog mode, and circuitry for establishing communications with a wireline communications system, the base station allowing an exchange of information between mobile station and wireline system in the analog mode.

3 Claims, 9 Drawing Sheets

SYSTEMS AND METHODS FOR IMPLEMENTING PRIVATE WIRELESS COMMUNICATIONS

TECHNICAL FIELD OF THE INVENTION

The present invention relates in general to wireless communications systems and in particular to systems and methods for implementing private wireless communications.

BACKGROUND OF THE INVENTION

Private branch exchanges (PBXs) using conventional wireline telecommunications technology are commonly found in corporate, campus and similar environments where communications internal to the organization or site are frequently required. Generally, a PBX or key sets system is closed, with service provided only to a given number of telephone units or approved users. Internal calls are then normally made on a fixed-fee or fixed-cost basis. The primary advantage of PBX systems is their ability to support internal communications without resort to the public switched telephone network. Among the additional advantages of PBX (closed) systems are their ability to support reduced-digit dialing, private telephonic messaging (phone mail) and private operator services.

With the advent of cellular telephone technology, efforts have been made to develop localized private wireless systems for use, for example, in a campus, small office, home office or similar "PBX" environment. While some such systems have been developed, and standards established for their implementation and use, these localized wireless systems are still subject to substantial limitations, primarily related to user capacity.

The current standards for the Advanced Mobile Phone System (AMPS) analog technology, in particular TIA IS-94 includes provisions for the implementation of analog PBX systems. However, the voice quality of analog systems is substantially inferior to digital systems. Further, the typical analog system employs Frequency Division Multiple Accessing (FDMA) which inefficiently uses the available bandwidth, which is at a premium. Specifically, in FDMA, channels are differentiated by frequency alone, with only one user supported per channel. Since the bandwidth available to a given provider is limited by government allocation, the number of users the provider can service at one time (i.e. the capacity) is proportionately limited.

Standards for implementation of local area (private) wireless service, such as PBX, have also been established for Time Division Multiple Access (TDMA) systems, such as in TIA IS-136. TDMA is a digital technology which improves on the analog FDMA technology, and in particular triples the capacity over FDMA. In a TDMA system, the bandwidth available to a provider is divided into channels by frequency, as in FDMA, and then the channels are divided time-wise into slots, with two slots per user (using current full rate vocoder techniques). Essentially, multiple users time-share the same frequency band. Currently, 6 slots per channel are available in this technology, and hence three users can be supported on one channel. Nevertheless, even though the TDMA technology generally provides a 3-fold capacity increase over the FDMA technology, that increased capacity is still insufficient to meet increasing user demand.

Code division multiple access (CDMA), as defined in TIA IS-95, is currently the technology which most efficiently uses the available bandwidth. Along with increased capacity, CDMA also requires less frequency planning and the voice quality is improved due to soft handoffs. In CDMA, all users receive the entire signal and then filter out their respective information based on coding. Typically, CDMA uses direct sequence spread spectrum transmissions to and from pseudo-orthogonal users. One CDMA channel is 1.25 MHz wide, which is equivalent to forty-two 30 KHz AMPS or TDMA channels. However, in CDMA today approximately twenty users can be supported per sector on a 1.25 MHz channel while in AMPS, only two users can be supported per sector for the same spectrum, since those forty-two channels must be distributed across twenty-one sectors. Hence, CDMA generally provides theoretically a ten-fold improvement in capacity over AMPS. Up to this point, however, it has not been possible to use CDMA technology to support local (private) wireless systems.

Private systems can be supported by the TDMA and FDMA technologies since is it possible to implement "frequency reuse" with TDMA or FDMA. For example, with typical frequency planning, a given geographic region may be divided into 7 areas or macrocells, with each macrocell in turn partitioned into 3 sectors. The available frequency spectrum is then allocated across the seven macrocell patterns, with three control channels and fifty-seven voice channels generally allocated to each macrocell. In turn, each macrocell is partitioned into three sectors with one control channel and nineteen voice channels allocated to each sector. For a localized or private system, a low power microcell is overlaid over a portion of a given sector. Interference between the microcell and the macrocell is then controlled by frequency scanning and identification of the unused frequency bands and/or slots which can be used for private/local wireless transmissions.

For the same reasons that CDMA allows for more capacity per bandwidth, CDMA will not economically support private wireless exchanges for a closed user group on the same RF channel as the macro system. Specifically, since all macrocells and sectors are on a single channel, it is not possible to "steal" a channel or slot for private use. Users are differentiated by the coding, and interference between cells is essentially controlled by controlling the power level between the base stations and the mobile units. The overlay of a microcell in such a system is highly impractical. Among other things, microcell transmissions can overpower macrocell transmissions to nearby mobile units. Similarly, passing mobile units, not part of the private system, can overwhelm the microcell base station to the detriment of the private user group. While it is possible to hand-off power control of mobile units roaming into the coverage area of a microcell to the microcell base station, the burdens on the private system may be dramatically increased. In particular, not only is control of all private users required, but also that of any mobile unit which randomly enters the coverage area, which would place an excessive burden on the microcell base station, depending on the number of mobile units transitioning the coverage area.

Another possible approach is to assign each private system a dedicated CDMA RF channel. This approach, however, would be substantially complex and costly to the service provider. First, frequency replanning would be required to accommodate each private channel vis-a-vis the existing public channels. Second, by dedicating a CDMA channel to private use, a corresponding CDMA channel is no longer available for public use throughout the coverage area. In other words, a dedicated CDMA channel for private use will render forty-two AMPS public channels unavailable. The problem only becomes compounded as more resources are transferred from public to private systems. Since service providers are generally concerned with optimizing revenue, the option of dedicating channels to closed groups in small coverage areas with limited revenue potential at the expense of potentially higher revenue public uses is unacceptable.

Other proposed approaches for implementing private CDMA systems in view of the interference problems have included establishing "guard zones" around each microcell and desensitization. In the guard zone approach, microcell to macrocell interference would be reduced by confining all the private mobile systems to a specified region around the microcell base station. This approach is not practical. First, confining the mobile stations into a specific area is difficult. Second, even though some natural attenuation of the transmitted signals can occur, a system of artificial attenuation to control signal levels within the microcell would still be required.

In the desensitization approach, the noise floor would be raised such that a soft handoff naturally occurs at the macrocell—microcell boundary. In other words, the sharpness of signal difference at the microcell/macrocell boundary is reduced by the higher noise floor such that the mobile station naturally transitions from one microcell/macrocell to the other. The same problem discussed above still results. Namely, the microcell base station now must control all mobile stations which cross into the microcell region, whether or not those mobile stations belong to the closed user group.

Thus, the need has arisen for circuits, systems and methods for implementing a private (local) wireless communications system while still maintaining the availability of CDMA technology. Such circuits, systems and methods should, among other things, allow establishment of a private wireless system in which interference between a macrocell, non-user mobile units, and the private system is eliminated or substantially reduced. In doing so, the burden of power control should not be unduly placed on the private system. Additionally, the convenience of the private mobile units should also be maintained.

SUMMARY OF THE INVENTION

According to one embodiment of the present invention, a communication system is provided which includes a dual mode mobile station operable to selectively communicate in CDMA and analog modes and a home base station. The home base station includes circuitry for establishing analog wireless communications with the mobile station in the analog mode and circuitry for establishing communications with a wireline communication system, the base station thereby allowing an exchange of information between the mobile station and the wireline system in the analog mode.

The principles of the present invention are also embodied in methods of implementing wireless communications. In one such method, in a first mode, communications are established between a mobile station and a wireless system using code division multiple access signaling. In a second mode, communications are established between the mobile station and a wireline system, this step including a number of substeps. The wireless connection is established between the mobile station and a private base station using analog signaling. A connection is also established between the private base station and the wireline network. Information is then exchanged between the mobile station and the wireline network via the private base station.

According to an additional embodiment of the invention, a private wireless system is provided which includes a multiple mode mobile station and a home base station. The mobile station has a private operating mode in which the mobile station transmits and receives signals in the advanced mobile phone system (AMPS) format. Home base station selectively communicates in the private mode with the mobile station using signals in the AMPS format. The home base station is further coupled to a public switched telephone network. Thus, the home base station implements an exchange of information between mobile station and the public switch network in the private mode.

The apparatus, systems and methods embodying the principles of the present invention provide substantial advantages over the prior art. Among other things, private (local) wireless communication systems can be implemented while still maintaining the availability of more favorable CDMA technology. Such private wireless systems can advantageously be established without substantial interference from an overlying macrocell or nearby non-authorized mobile unit. In doing so, the burden of system control is not unduly placed on the private system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–5 of the drawings, in which like numbers designate like parts.

Figure 1:
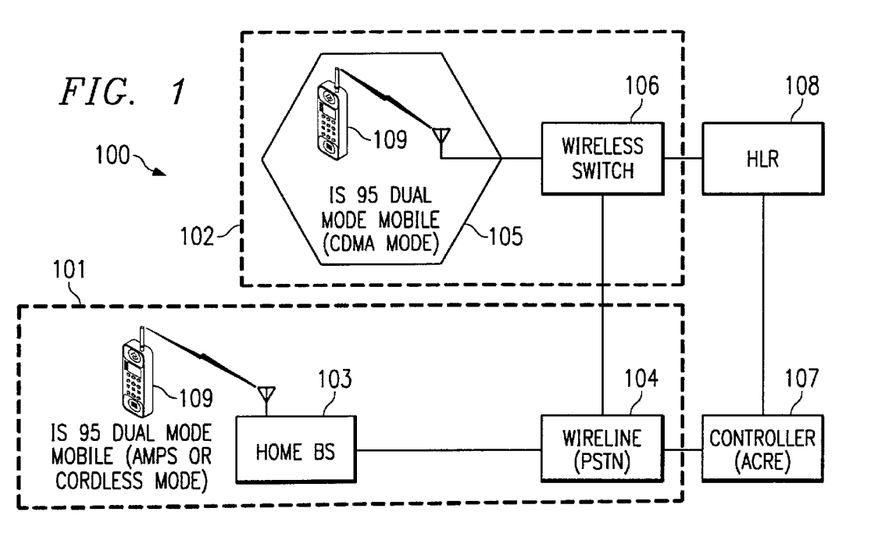
FIG. 1 is a high level conceptual block diagram illustrating a dual mode system embodying the principles of the present invention.

FIG. 1 is a conceptual block diagram depicting the general features of a dual mode telecommunications system 100 embodying the principles of the present invention. System 100 includes a local (private) subsystem 101 and a cellular subsystem 102 (preferably a CDMA system, although this is not an absolute requirement).

Private subsystem 101 includes a home base station 103 coupled to a wireline technology public switched telephone network (PSTN) 104, preferably through an RJ 11 connector. Home base station 103 may be physically located, for example, in a corporate office suite, campus, private home, individual office, or similar site where private and/or localized wireless communications are desirable.

Cellular subsystem 102 includes a service provider's wireless communications system, generally shown at 105 for a selected macrocell. Wireless communications switch system 106 is coupled to a home location register 108 for registering subscribing mobile stations. Control of the interconnection of PSTN 104 and wireless switch system 106 is performed by authorization and call routing equipment (ACRE) 107.

According to the principles of the present invention, at least one mobile station is operable in multiple modes to allow for public wireless, private wireless, or cordless telephone operation. In the preferred embodiment, a given multiple mode mobile station 109 can operate in one of a CDMA mode, an AMPS private mode or a cordless mode. In the CDMA mode, the multiple mode mobile station 109 communicates with CDMA macrocells, such as that shown at 105, in a conventional manner as per IS-95. In the private system mode, a given mobile unit 109 can be configured to communicate with the home base station as an analog cellular phone, preferably under either the IS-91A or IS-94 AMPS standards or as a cordless phone. In other words, a mobile system 109 can operate in the CDMA mode when roaming in a CDMA macrocell away from the home base station 103, while within the coverage area of home base station 103 it can operate in an AMPS or cordless phone mode. In the private system mode, the home base station 103 and corresponding mobile station "steal" an available AMPS frequency band. As discussed further below, home base station 103 searches for and priortizes the available channels.

In the preferred embodiment, home base station 103 will respond to at least two numbers. First, home base station 103 will respond to PSTN 104 when a calling party has entered a wireline telephone number assigned to that base station. If a registered mobile station is within the base station coverage area and is properly configured, it will act as a cordless phone to answer the call. Second, home base station 103 will respond to a mobile identification number (MIN) received for a registered mobile station 109 within the coverage area. In this case, when an authorized mobile station 109 in the private mode registers with a home base station 103, that home base station in turn registers the mobile station with home location register 108. Subsequently, when any caller dials the mobile station's number, the call is routed via wireless switch system 106 to PSTN 104 and home base station 103 which then passes on the call using AMPS or the cordless feature; a direct wireless connection to mobile station 109 from wireless switch system 106 is foregone. Advantageously, airtime charges for a wireless transmission are eliminated, at least from the receiving user's reference.

During a call out in the private mode, a mobile unit 109 connects with the corresponding home base station 103 in either the AMPS or cordless telephone mode, as desired. The home base station in turn establishes the appropriate connection through PSTN 104.

Figure 2A:
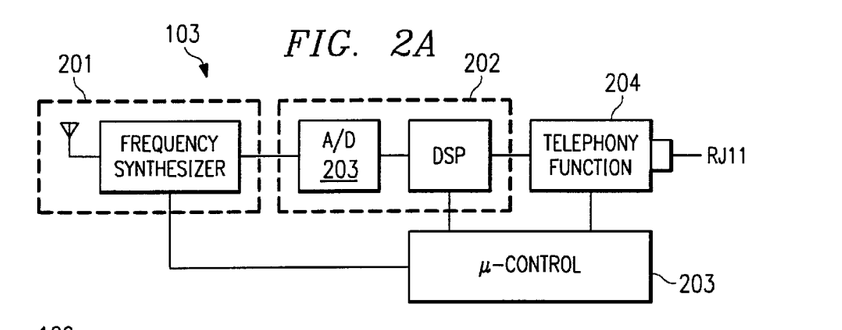
FIG. 2A is a high level functional block diagram of the preferred embodiment of the home base station depicted in FIG. 1.

A high level block diagram of home base station 103 is provided in FIG. 2A. Base station 103 includes a radio frequency/intermediate frequency (RF/IF) front-end 201, modem—transmitter/receiver section 202, a microcontroller 203, and telephony interface module 204.

Figure 2B:
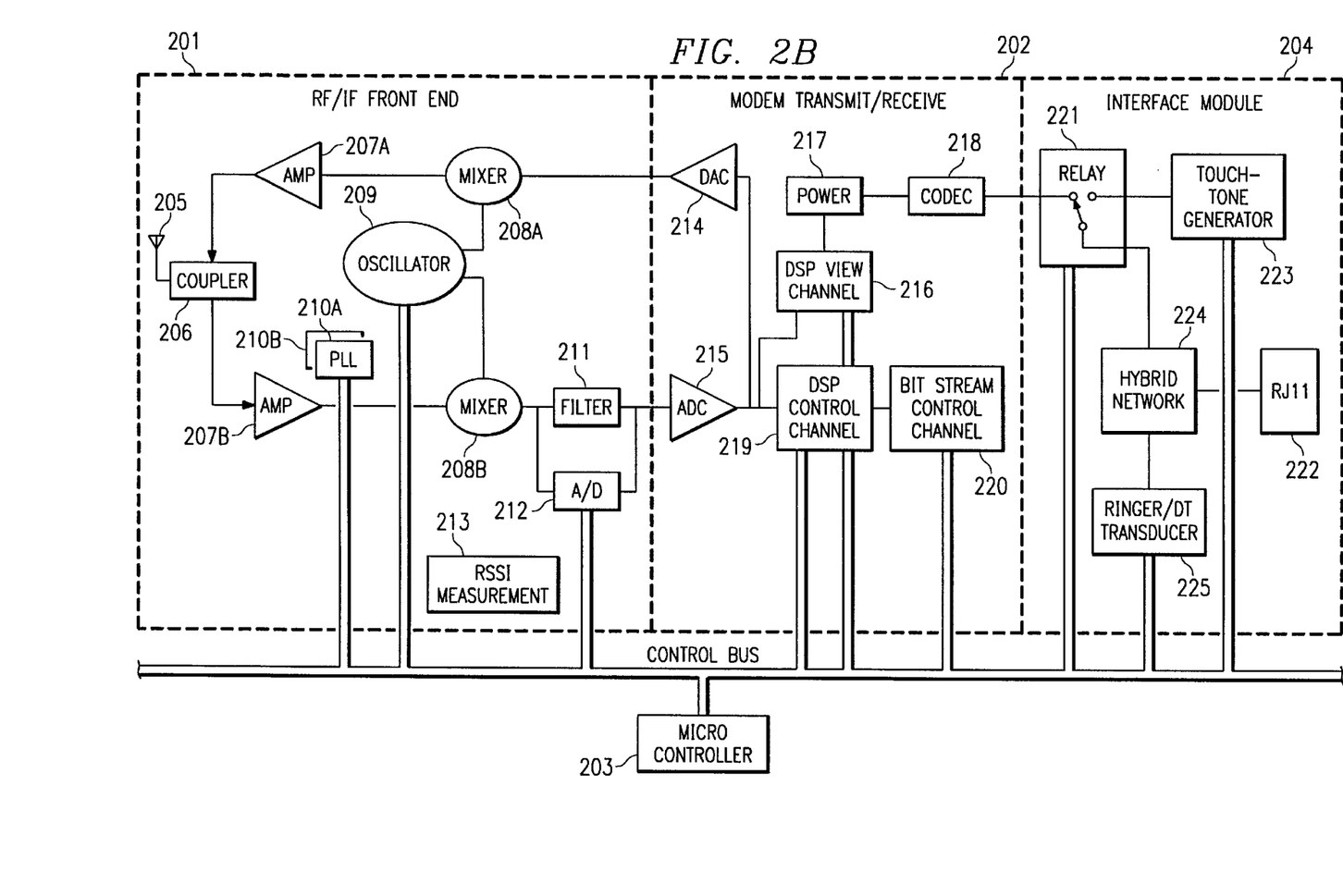
FIG. 2B is a more detailed functional block diagram of the home base station depicted in FIG. 2.

A more detailed functional block diagram of home base station 103 is provided in FIG. 2B. RF/IF front end 201 includes antenna 205, a bidirectional coupler 206 and a power amplifier 207A in the transmit path and a low-noise amplifier 207B in the receive path. In one embodiment, the CDMA RF signal is defined in one of a plurality of 1.25 MHz channels allocated across 12.5 MHz bands generally centered around 800 MHz (with a 12.5 MHz up-link band and a 12.5 MHz down-link band per service provider). Alternatively, the CDMA RF signal may be one of a plurality of channels disposed in 5, 10 or 15 MHz bands centered around 1.9 GHz. Up conversion in the transmit path is performed by a mixer 208A and down conversion is performed in the receive path by a corresponding mixer 208B. Frequency conversions by mixers 208 is in response to a local oscillator signal provided by oscillator 209. A pair of phased-locked loops 210A and 210B control mixers 208 and oscillator 209, which advantageously allows fast changeover between the voice channel and the control channel and reduces scanning time. Dual phased-locked loops 210 are more particularly described in copending and coassigned U.S. patent application Ser. No. 08/409,802, filed on Mar. 24, 1995, entitled "MICRO-CELLULAR RADIO COMMUNICATIONS SYSTEMS".

The down converted output of mixer 208B is passed through a filter 211 and is monitored by microcontroller 203 through an analog-to-digital (A/D) converter 212. Further, front end 201 includes the RSSI (radio signal strength indicator) measurement hardware 213.

Modem-Transmitter/receiver 202 interfaces with RF/IF front end 201 through a digital-to-analog converter 214 in the transmit path and an analog-to-digital converter 215 in the receive path. Two channels are provided, each coupled to the input of digital-to-analog converter 214 and the output of analog-to-digital converter 215. The voice channel is passed through a digital signal processor 216, power control circuitry 217 and a codec 218. The control channel is passed through a digital signal processor 219 to bitstream control channel circuitry 220. A relay 221 interfaces section 202 with the telephony interface module 204 and specifically, the input/output of CODEC 218. Telephony interface module 204 couples to PSTN 104 through RJ11 connector 222. Generally, interface module 204 includes a touch-tone (DTMF) generator (transceiver) 223 for communicating PSTN 104, a hybrid network 224 providing signal compatibility and connectivity to the two-wire loop plant of PSTN 104, and a ringer/dial tone detection transducer 225.

Telephony interface 204 comprises four subsystems namely: (a) dial-pulse/touch-tone transceiver (generator) 223, (b) hybrid network and related circuits 224, (c) ringing current and dial-tone detection transducer 225 and (d) relay function 221. Dial-tone/touch-tone transceiver 223, hybrid circuit network 224 and ringing current/dial-tone transducer 225 constitute the wired telephony function of home base station 103. Relay circuit 221 is a specialized relay arrangement that integrates the wireless function of home base station 103 to the wired telephony function.

Dial-pulse/touch-tone transceiver (generator) 223 is controlled by an external switch (not shown) to set the apparatus to the correct signaling mode for local switching. The transceiver 223 receives the output digits for calls originating from the microcontroller 203 and transfers the information to the local exchange loop. In case of communications with the ACRE 107, transceiver 223 receives information from the microcontroller and transfers that information using a touch-tone signal. The connection to the apparatus 107 is established by the local exchange and the network. Dial-tone/touch-tone transceiver 223, under the control of the microcontroller, sends the appropriate information to the local exchange using the signaling method of the local exchange and maintains the correct frequency, timing and pulse shape for communicating with the local loop and other network apparatus.

Hybrid circuit network 224 performs the traditional two-wire to four-wire conversion of the loop plant and the additional functions of side-tone and noise management. The adjustment of the volume of the conversation and implementation of a mute function is also included in this subsystem. Hybrid network 224 is controlled by microcontroller 203 for testing, adjustment and maintenance.

On command from the microcontroller 203, ringing current/dial-tone detection transducer 225 detects the reception of ringing current or dial tone from the loop plant and sends the message to microcontroller 203. Microcontroller 203 also sends instructions to remove the transducer from the loop at the appropriate state of the control.

Relay circuitry 221 has several important functions. In the idle situation, relay circuitry 221 ensures that the local loop plant provides the local exchange the exact circuit condition of a wired telephone system. During the originating call stage, relay circuitry 221 ensures that the circuit parameters to the local loop plant for dial-tone detection and signaling are similar to that provided by the wired telephone system. In particular, relay circuitry 221, in conjunction with the wired telephony system, generates a valid seizure signal, waits for the dial-tone, detects the dial-tone and then transmits the valid dialing digits to the local exchange. It then couples base station 103 to the mobile station 109 system for transfer of all audible signals.

In the case of an incoming call, relay circuitry 221 ensures that the local loop receives the exact treatment as a ringing current reception from a wired telephone. In this case, the wireless system was alerted for the incoming call. On reception of the call acceptance by mobile station 109, relay system 221, working with microcontroller 203, transfers the correct answer signal to the local exchange and couples the audio signals from the local exchange to mobile station 109.

During the subsequent conversation, relay circuitry 221 maintains the coupling of the audio signals in both directions. Any secondary signal accepted by the local exchange is transmitted by relay circuitry 221 using the three wired telephony systems. Relay circuitry 221 under control from microcontroller 203 will connect to either cordless or AMPS wireless systems to establish the complete communication path.

Microcontroller 203 is responsible for all control functions of the home base station 103. The control messages from the wired network side to the wireless network side is transferred through microcontroller 203. Microcontroller 203 is responsible for the following major tasks:

1. Message transfer between the wired network to the wireless network of the home base station;
2. Scanning of the AMPS RF spectrum and determination of the usable channels for the AMPS mode private communication;
3. Controlling the relay circuitry 221 to establish coupling for audio signals;
4. Registration of mobile terminal 109 and communication with ACRE 104 to ensure that the registration is known to the wireless network;
5. Managing the outgoing and incoming calls to home base station;
6. Paging an incoming call;
7. Digit transfer to transceiver 221 for outgoing calls;
8. Maintenance and diagnostic testing of the system; and
9. System initialization.

The control system of microcontroller 203 performs the above tasks through an operating system of priority queues and interrupts system. All incoming messages to microcontroller 203 generate an interrupt to transfer the message to the system. Microcontroller 203 interrupts the current task, accepts the message and then uses the priority scheduler to schedule the next task. A timer system generates a timer interrupt in the system to schedule the time-dependent tasks. According to the criticalness of the tasks, the above functions are scheduled by a priority system. In case there are no pending tasks for the microcontroller 203, it performs the scanning, maintenance and diagnostic functions.

Figure 3:
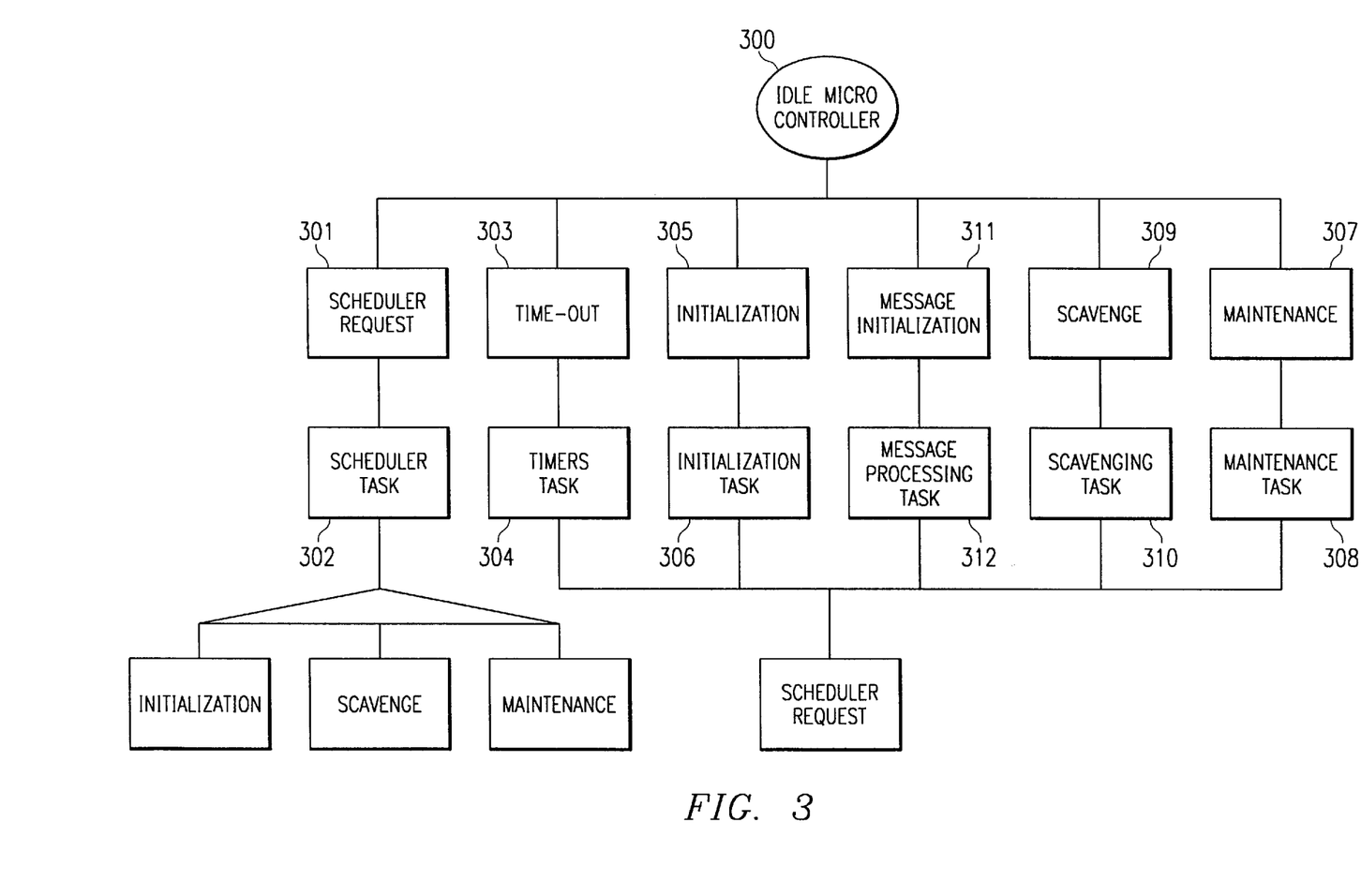
FIG. 3 is a flow chart illustrating the operational structure of the microcontroller shown in FIG. 2A.

FIG. 3 is a diagrammatic presentation of the control structure of microcontroller 203 in the preferred embodiment. During the period when base station 103 is in a power-on state, microcontroller 203 is in the idle state at Step 300 and generates an initialization signal to start system initialization. On completion of initialization, the controller enters the ready state. Then, when telephonic activity is required, the processing is organized in six major tasks.

All tasks send a scheduler request at Step 301. The scheduler task at step 302 prioritizes (schedules) the various tasks for execution when multiple scheduler requests have been received.

When a time-out request is granted at step 303, the timer's task is executed at step 304. In the timer's task, determination is made as to whether telephonic activity with base station 103 has ceased for a pre-determined period of time and a new task will be scheduled with the microcontroller. If such activity has ceased, microcontroller 203 returns to idle after reissuing a scheduler request as step 300. The scheduler task then allocates the appropriate task to the microcontroller. When timer's task requires execution again, a time-out signal is issued back to scheduler task 302.

When an initialization request is granted at step 305, initialization takes place at step 306. Any time initialization is required, a scheduler request is made to the scheduler task at steps 301 and 302. Similarly, when maintenance is required, and a maintenance request is granted at step 307, maintenance takes place at step 308.

Requests to execute the scavenge task is executed at steps 309 and 310. Spectrum scavenging can be performed whenever base station 103 is not being used for conversations and continuously updates the channel list identifying the analog frequency channels which are available for use to support private (that is, local) communications. As described more completely in copending and coassigned U.S. patent application Ser. No. 08/409,802, entitled "MICRO-CELLULAR RADIO COMMUNICATIONS SYSTEMS", the scavenging algorithm detects available channels by measuring an up-link signal strength from another mobile station 109 operating in the second mode within an area proximate to the base station 103, measuring a down-link signal strength from another base station 103 operating proximate to the base station 103 and, in response to the steps of measuring, maintaining a list of available channels.

Whenever the best channel drops from the top of the list, the base station chooses the new, highest channel as a control channel and transmits the AMPS control channel message on that channel. The next two to five channels on the list are then used for voice conversation transmission. Thus, the microcontroller will never stay idle after initial power-on.

When the message-processing request is granted at step 311, the message-processing task is executed at step 312.

In the preferred embodiment, base station 103 uses the analog voice channel transmissions to exchange voice traffic with a registered mobile unit 109 within its coverage using cellular/PCS (personal communications system) and/or a non-regulated frequency spectrum. An up-receiver functionality is used to measure the up-link RSSI of a mobile unit 109 operating in the private mode using the cellular/PCS frequency available near home base 103. A down-receiver functionality is used to measure the down-link RSSI of other home base or AMPS cellular base stations near the given home base station 103. A software control algorithm continuously performs the up-receiver and down-receiver functions to develop and maintain the list of control frequencies and voice channel frequencies that can be used for the control and cordless function. In particular, from the RSSI results, home base station 103 ensures that lock-on is made to a mobile unit 109 transmitting across a clear AMPS channel, rather than to a higher powered public wireless transmission or a mobile station communicating with another home base station.

In the preferred embodiment, a control message transmitted from base station 103 across a private AMPS control channel so that a mobile station 109 operating in the analog mode can select that same control channel and transmit its control information back to base station 103. The control information received from a mobile station operating in the AMPS mode is checked for registration and/or authentication purposes before that mobile station is accepted for communication with base station 103. Based on the registration ID received from the given mobile system 109, base station 103 selects whether the simple cordless function or a CDMA/AMPS wireless function is to be used.

With regards to a simple cordless function or an outgoing call, the control channel carries the called number to base station 103. Home base station 103 then initiates a call set-up function to the PSTN and allocates a voice channel to the mobile station 109. In the case of call termination, home base station 103 creates a page and a distinctive ringing, depending on whether operation is in the simple cordless phone or CDMA/AMPS mode.

When the mobile station 109 moves away from base station 103, it could be either in an idle or conversation state. While in the conversation state, mobile system 109 continues to monitor the fade timing status and if no SAT can be detected for five seconds, mobile system 109 scans again for private system control channels. If any other private home base station 103 is found, which is authorized to be used, it will use that private system (home base) in the analog (AMPS) mode. Otherwise, it enters a CDMA system initialization state. In the CDMA system initialization state, custom system selection algorithm guides mobile system 109 to a CDMA macro cell that the mobile station is authorized to use in the CDMA mode.

While mobile system 109 is in the idle state moving away from base station 103, it monitors the paging channel. When the RSSI of the paging channel drops below a predetermined threshold, the system initialization state is entered. Again, a custom selection algorithm guides mobile station 109 to find a CDMA macro system.

When mobile station 109 is operating in system 100, in order for it to detect system 103, at least two approaches may be applied. The preferred approach is for mobile system 109 to automatically search for a private system 103 to which it is authorized to received service. In this approach, the mobile system periodically scans for analog control channel that carries wireless PBX 103's system information. This period could range from a few seconds to a few minutes or so. If any private system 103 is found, which the given mobile station 109 is authorized to use, that mobile 103 may exit from CDMA system 105 and enter private system operation with procedures specified herein.

Figure 4A:
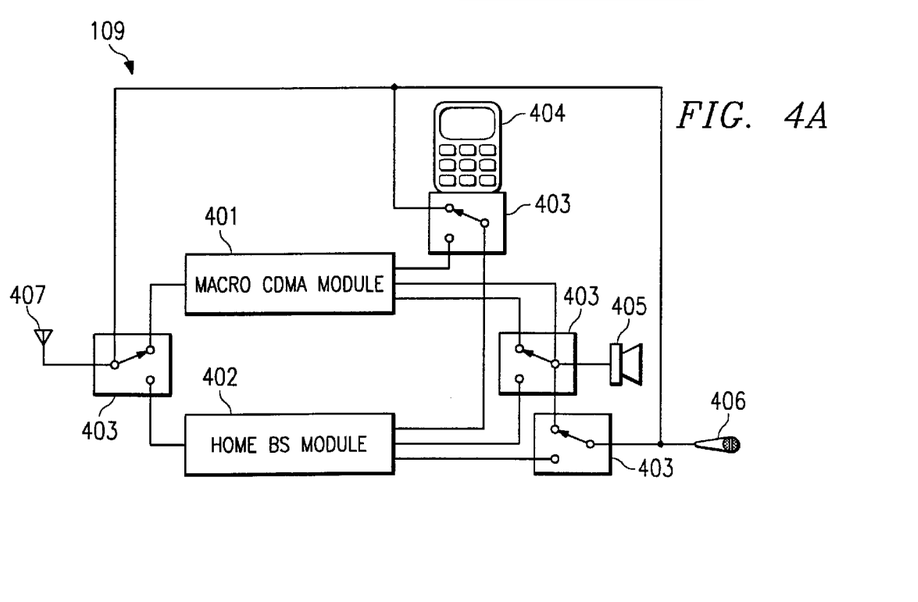
FIG. 4A is a functional block diagram of the mobile station shown in FIG. 1.

As an alternative approach, mobile system 103 could also be equipped with a manual "bottom" on keypad 404 which will allow the user to manually control switch system 403. As such, while the mobile station is operating in the macro network (i.e., either in CDMA mode or on one of the AMPS standard control channels), and is moving into the coverage boundary of a wireless PBX, home residential system, or cordless BS, the user must activate the button. It should be noted that while mobile station 109 is engaged in a voice or data communication, the button cannot be activated by the user. Once the button is activated, mobile base station 109 aborts whatever process it is performing and exits from the state it is in. Mobile station 109 then scans for a wireless PBX or a home residential system control channel. If a control channel can be found, the mobile station operates in the mode as specified by appropriate standards (IS-94 or IS-91-A), or it may operate in a cordless environment. If, however, a control channel cannot be found, then mobile station 109 shall try to scan for a CDMA system again.

FIG. 4A is a high-level functional block diagram of a selected mobile station 109. The primary components of mobile station for purposes of the present discussion, are macro CDMA module 401, home base station (AMPS) module 402, and switch system 403. Also depicted are keypad 404, speaker 405, microphone 406 and antenna 407. In alternate embodiments, switch system 403 responds to a manual button to change between the cellular (CDMA) mode and the private mode. In the preferred embodiment, mobile station 109 may be provided with scanning compatibility to search automatically for private systems and switch depending on the results.

Figure 4B:
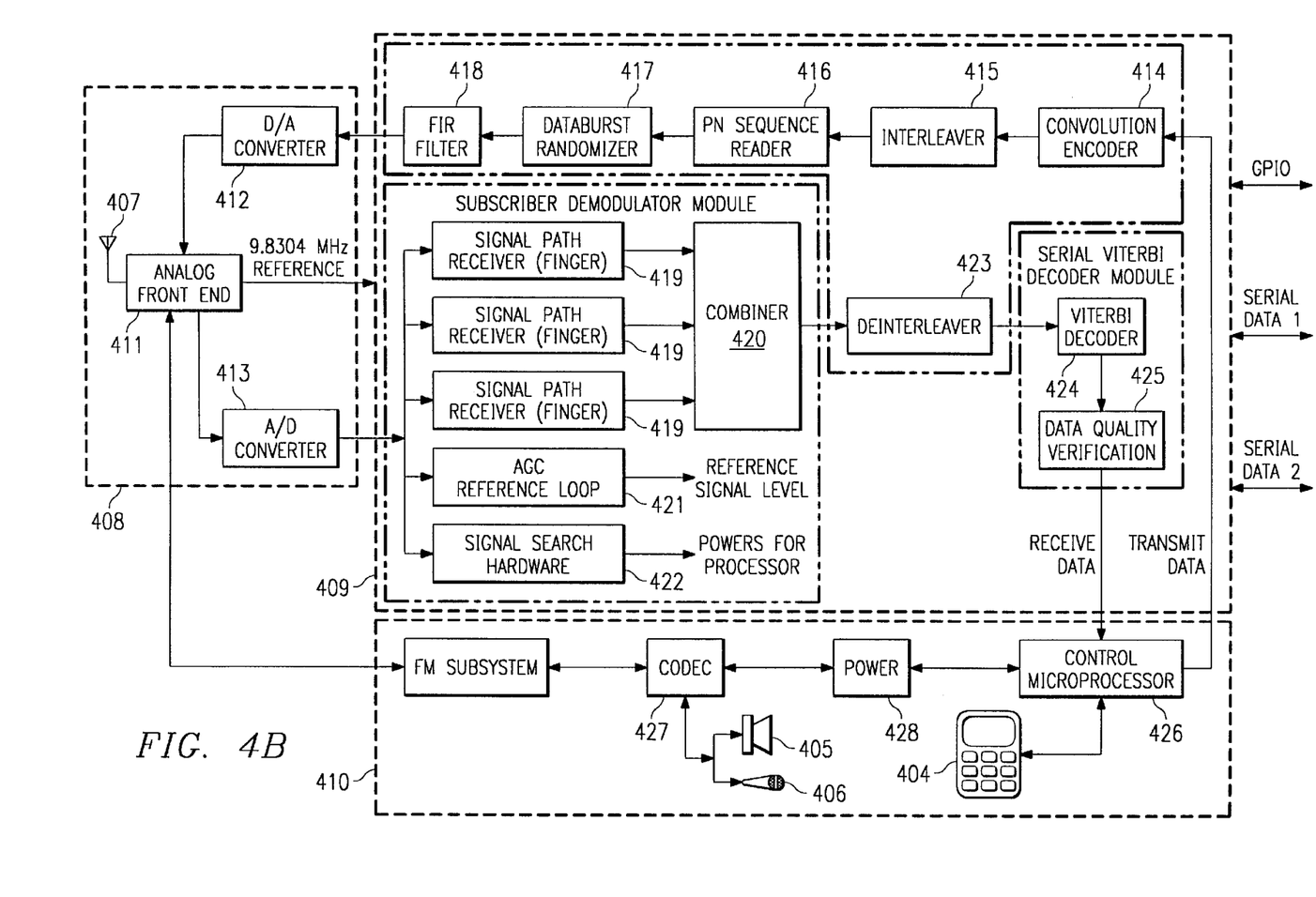
FIG. 4B is a more detailed functional block diagram of the CDMA module shown in FIG. 4A.

FIG. 4B is a more detailed block diagram depicting the CDMA portions of a selected mobile station 109. In the embodiment illustrated in FIG. 4B, the mobile station includes an analog transmission/reception section 408, digital CDMA receiver/transmitter section 409 and a user interface section 410.

Analog transmit/receive section 408 includes the antenna 407 and analog front-end section 411. Analog front-end 411 includes the low noise amplifiers, oscillators and mixers required to up-convert an output analog signals during transmissions and input and down convert analog signals during reception. In the transmission path, digital-to-analog converter 412 is included for converting digital information provided from digital section 409 to analog form for transmission. Similarly, an analog-to-digital converter 413 is included for converting the mixed-down analog signal from an analog to a digital form for processing by digital section 409.

Digital section 409 includes a transmit path and a receive path. Data being transmitted is output from user interface section 410 and encoded by a convolutional encoder 414. The encoded data is then passed through an interleaver 415 and PN sequence reader 416. The digital data is then processed by a data burst randomizer 417 and passed through a FIR filter 418 before being sent to D/A converter 412 for analog transmission.

The receive path includes the CDMA receiver fingers 419, the outputs of which are combined by a combiner 420. An automatic gain control (AGC) reference loop 421 generates a reference level for setting power levels in the receiver. Signal search hardware 422 searches for the strongest channel available.

The output of combiner 420 is passed through a Deinterleaver 423 and on to a serial Viterbi decoder 424. Before being passed to interface module 410, the quality of the data is verified by circuitry 425.

Interface unit 410 is under the control of microprocessor 426. Microprocessor 426 interfaces with the digital receive and transmit paths along with the keypad and display unit 404. Keypad and display unit 404 provides the user interface for alphanumeric data. Microprocessor 428 also controls the input and output of user audio data through a microphone and speaker 405/406, codec 427 and power controls 428. FM subsystem couples the FM carrier analog front-end 408 and CODEC 427.

Figure 4C:
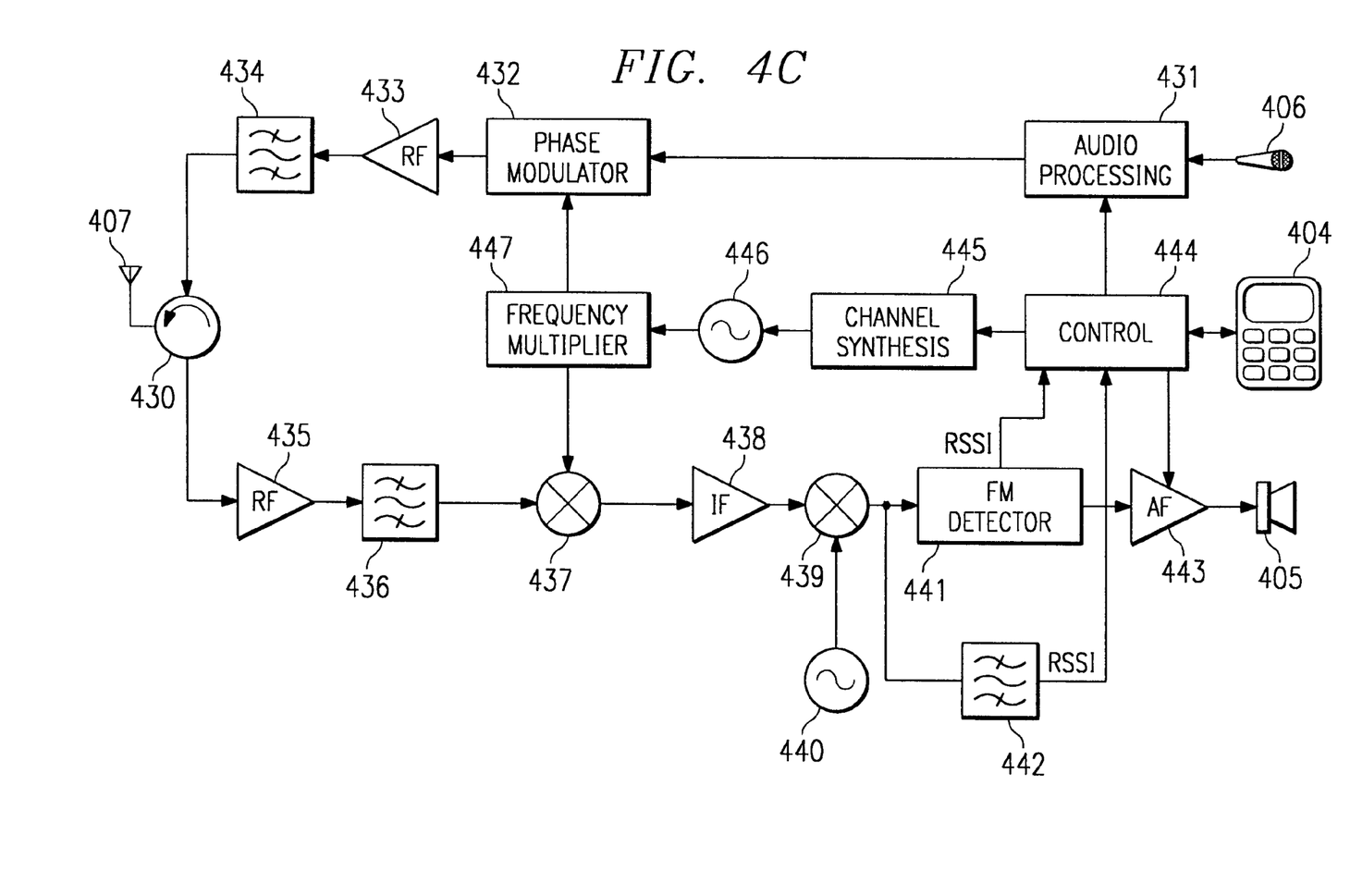
FIG. 4C is a more detailed functional block diagram of the mobile station AMPS module shown in FIG. 4A.

FIG. 4C is a more detailed functional block of the AMPS portion of mobile station 109. The front-end of module 402 includes a duplexed antenna 407 used for both transmit and receive functions and accessed through a circulator 430.

Received signals are amplified by RF amplifier 435 and then filtered by a bandpass filter 436 to eliminate out-of-band signal components. The received signal is then down-converted by a mixer 437 to an intermediate (IF) frequency using a mixing signal received from frequency multiplier 447. Frequency multiplier 447 is programmable to provide variable frequency mixing signals in response to a look-up table, control circuitry 444, channel synthesizer 445 and oscillator 446. The IF signal is then filtered by an IF filter 438 and then down-converted again to a baseband signal by mixer 439 in response to a mixing signal from a local oscillator 440.

The baseband signal output from mixer 439 is provided to an FM/FSK/QPSK detector 441 for processing when the signal carries voice data (FM or PSK for analog and QPSK for digital) and to control circuitry 444 through a filter 442, when control channel identification is required. Control circuitry 444 includes matched filters or spectrum analyzers which identify the channel as a control channel by identifying the modulation scheme and/or spectrum characteristics.

The transmit path includes audio processing circuitry 431 for processing voice received from a microphone 406, a phase-modulator 432, RF amplifier 433 and a bandpass filter 434. As described more completely is to copending and coassigned U.S. patent applications having Ser. Nos. 08/710, 285 and 08/713,383, both filed Sep. 13, 1996, and both entitled "METHOD AND SYSTEM FOR QUICKLY FINDING A CONTROL CHANNEL IN A PRIVATE CELLULAR SYSTEM", which describe a method for quickly locating a control channel in a private system by determining the modulation type of the particular channel. After scanning a received RF channel, the received signal is used for evaluation of the modulation type of the channel by using matched filters designed for the specific signal of interest, and/or for producing the spectral energy distribution of the channel to determine the modulation type. This method is significantly faster than traditional means and therefore enables the scavenging method described above.

Figure 5A:
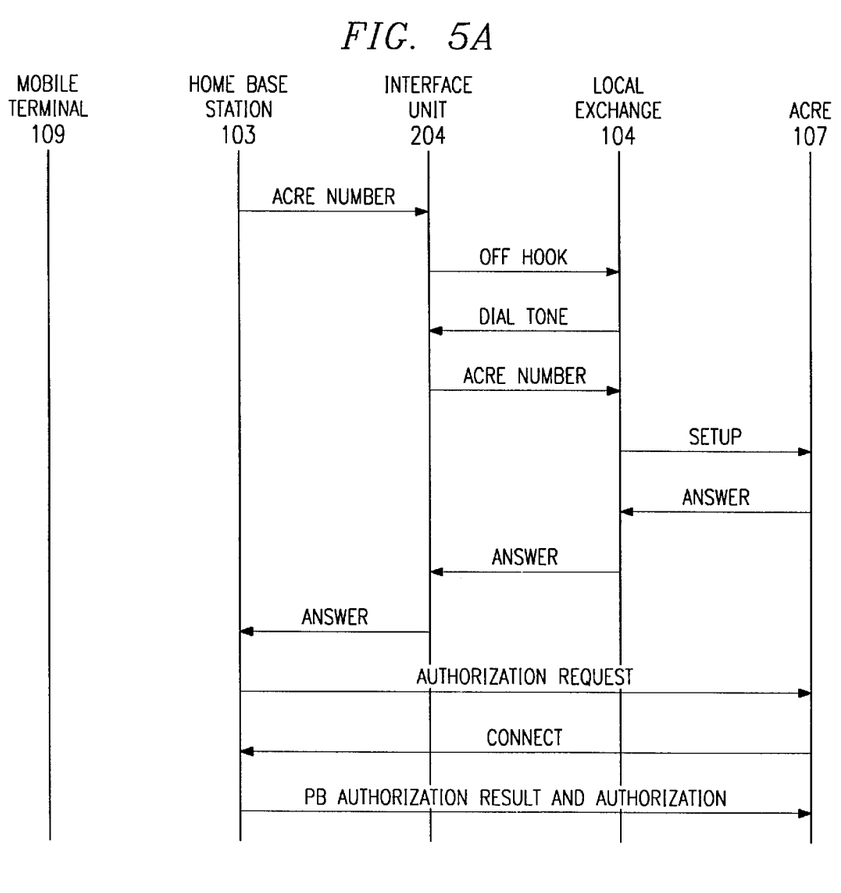
FIG. 5A depicts a preferred sequencing of events during the authentication of the home base station shown in FIG. 1.
Figure 5B:
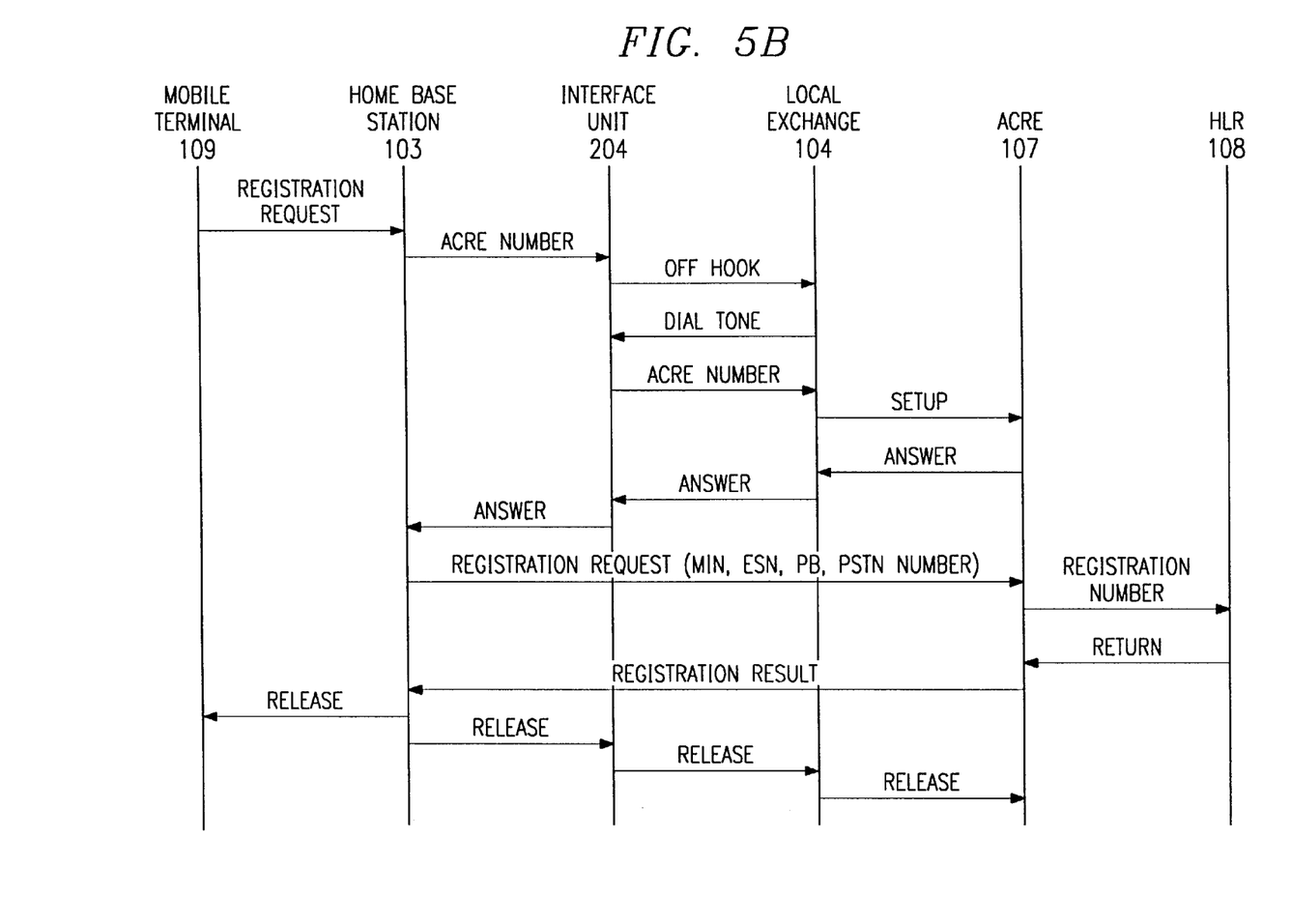
FIG. 5B depicts a preferred sequencing of events during the registration of a mobile unit with a home location register via a home base station.

FIGS. 5A–5B depict preferred messaging sequences between subsystems according to the principles of the present invention. It should be noted however that in alternative embodiments the sequencing of events may differ. It should also be noted that in FIGS. 5A–5D, events occur timewise from the top of the diagram to the bottom of the diagrams.

In FIG. 5A, home base station 103 is authenticated by ACRE 107 with which home base station 103 is to operate. This procedure is normally used on first time hook-up of a base station 103 and periodically afterward. Home base station 103 initiates the authentication process by transmitting an ACRE number identifying the ACRE to be used via its interface unit 204. In particular, interface unit 204 generates an off-hook signal to the local exchange, which when ready, returns a dial tone. The interface unit 204 then passes the ACRE number onto the local exchange.

The local exchange initiates connection setup to the selected ACRE 107. When ready, ACRE 107 passes an answer to home base station 103 through PSTN 104 and interface unit 204. The base station 103 sends an authentication request to ACRE 107 and if the authorization request is valid, home base station 103 is authorized to access ACRE 107. Home base station 103 then sends the result of the authorization back confirming its receipt along with authorization to ACRE 107 to access home base station 103 via PSTN 104.

FIG. 5B illustrates a preferred method of registering a selected mobile unit 109 with a home base station. In this case, the mobile system 109 sends a registration request to home base station 103. A connection is established between home base station 103 and the corresponding ACRE 107, using basically the same procedure for establishing an initial connection discussed above in conjunction with FIG. 5A.

Once a connection is established, home base station 103 sends a registration request to ACRE 107, which in turn sends a registration number to the Home Location Register 108. The registration request from home base station 103 preferably includes the mobile identification number (MIN) and electronic serial number (ESN) for mobile unit 109, the personal (home) base station 103 identifier and the number of the PSTN 104 being used. On registration within home location registers 108, return is sent to ACRE 107 which in response sends the registration results back to home base station 103 confirming the registration. When the registration is complete, each of the subsystems is released on initiation by home base station 103.

Figure 5C:
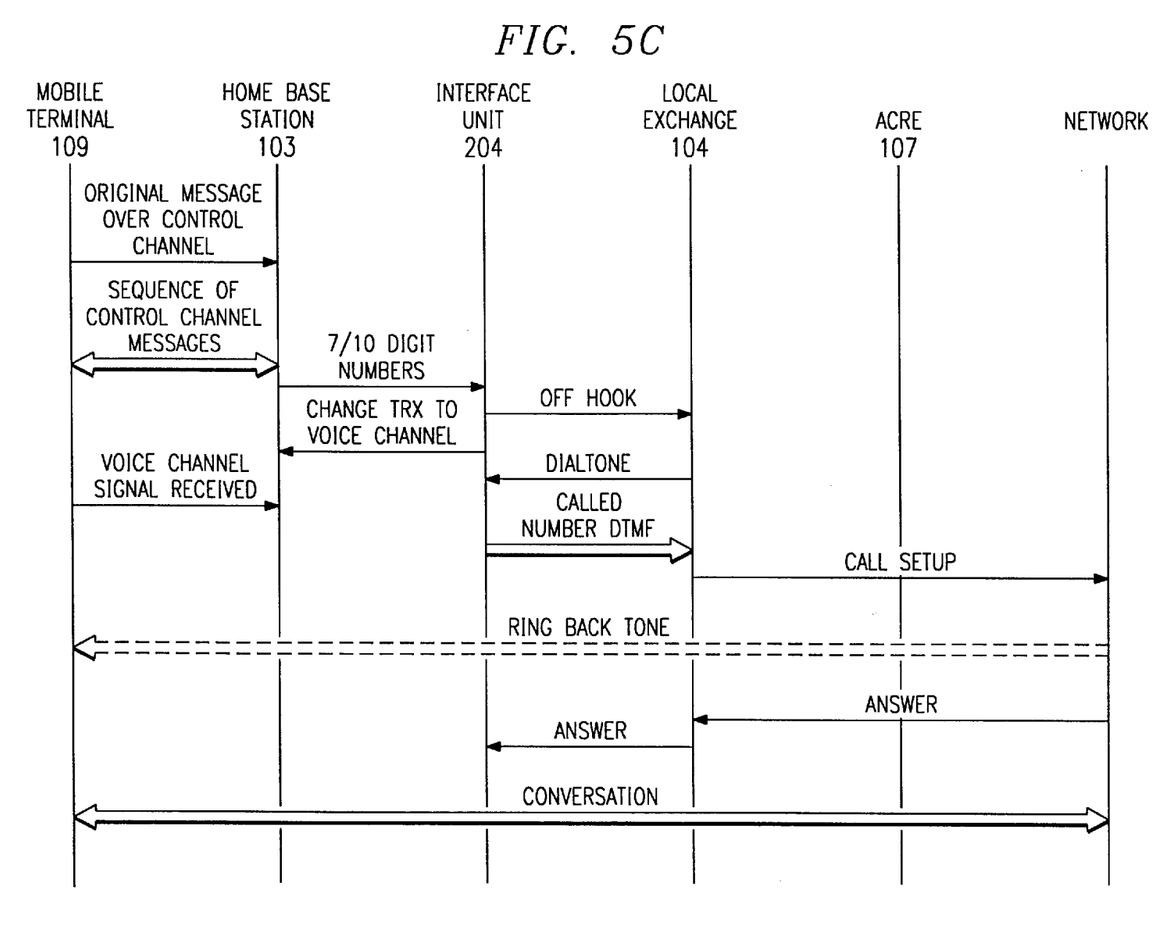
FIG. 5C depicts a preferred sequencing of events during the organization of a call by a mobile station via a home base station.

FIG. 5C indicates the situation where a given mobile station 109 originates a call via a home base station 103, according to the preferred embodiment of the present invention. The call origination begins with an origination message being sent over the selected AMPS control channel from the given mobile station 109 to the home base station 103. This is followed by a sequence of control channel messages between mobile terminal 109 and home base station 103. After this exchange of messages, a 7 or 10 digit telephone or mobile identification number is sent to interface unit 204 of home base station 103 to initiate the call across the wireline network.

Interface unit 204 initiates the wire line call by generating an off-hook signal to local exchange (PSTN) 104. In return, the local exchange 104 generates a dial tone. The transmission between the home base station 103 and mobile station 109 changes over from the control channel to the voice channel. Interface unit 204 then places a wireline call using a conventional dual tone multiple frequency (DTMF) signaling to the local exchange 104. Local exchange 104 sets up the call to target wireless and/or wireline networks. A ringback tone issued by the network is returned to the mobile terminal 109, local exchange 104, and home base station 103. When a connection base is made to the target telephone or mobile station, an answer is returned and conversation begins.

Figure 5D:
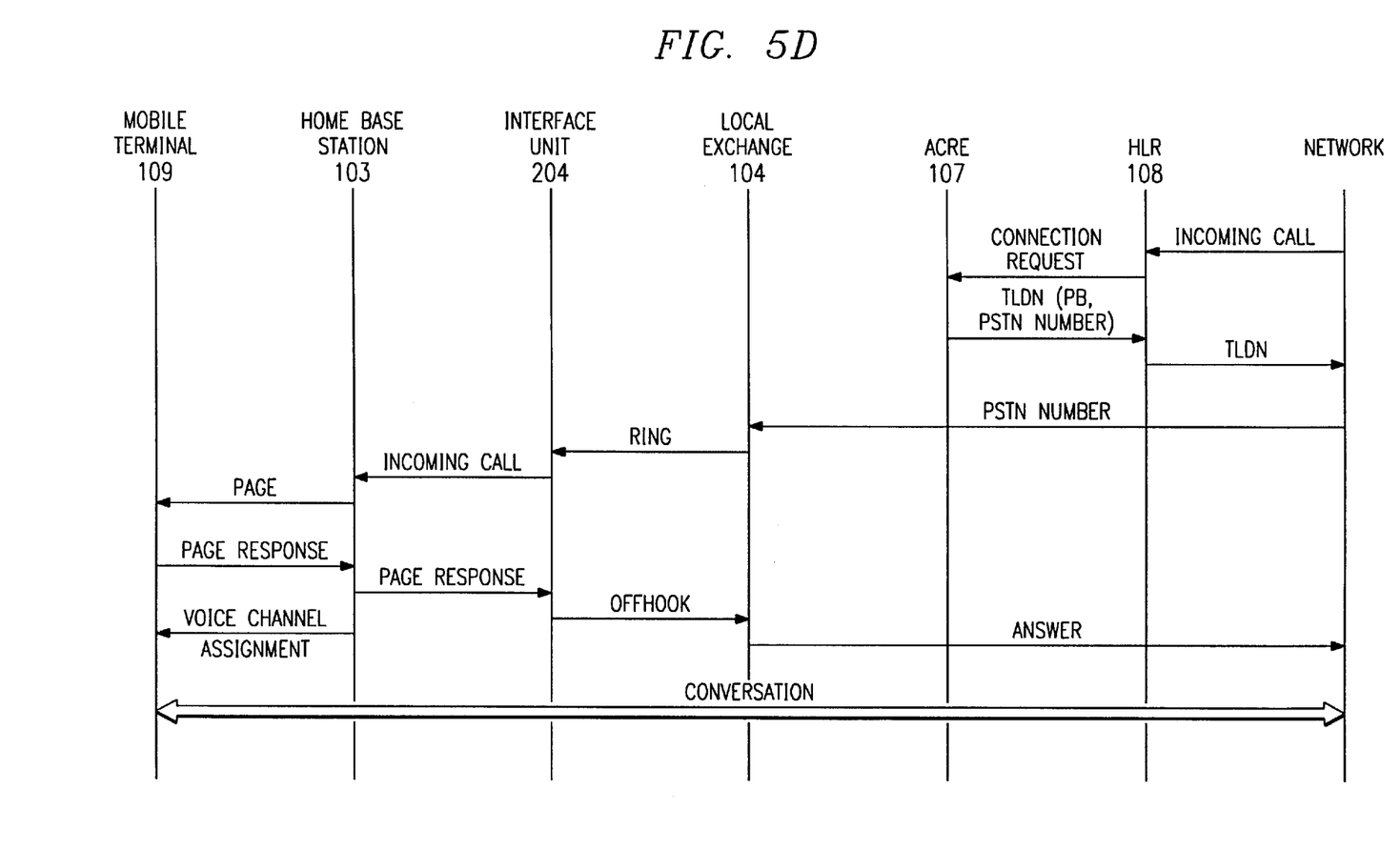
FIG. 5D depicts a preferred sequencing of events during the receipt of an incoming call to a mobile station via a home base station.

FIG. 5D illustrates the case where the call is incoming to a given mobile station 109. An incoming call is received from the initiating telephone or mobile station through the corresponding wireless and/or wireline network as to the home location register 108. If the target mobile station is registered, a connection request is passed onto ACRE 107. ACRE 107 duly returns a transmission line identification number (TLDN) including a PSTN number identifying the local exchange and a PB number identifying the home base station 103 to HLR 108 ultimately originating network. The network then connects with the local exchange by transmitting the PSTN number.

Upon receipt of the PSTN number, local exchange 104 rings interface unit 204 which notifies home base station 103 of an incoming call. The home base station 103 then pages the target mobile station 109 via an available AMPS or cordless channel. If the mobile unit responds, a page response is passed on to interface unit 204 which generates an off-hook signal to local exchange 104. Home base station 103 makes a voice channel assignment for communications with the given mobile station 109. Local exchange 104 generates an answer to the originating network, the connection between the originating network and mobile station is established, and conversation subsequently takes place.

Although the present invention and its advantages have been described in detail, it should be understood that various changes, substitutions and alterations can be made herein without departing from the spirit and scope of the invention as defined by the appended claims.

What is claimed is:

1. A method of implementing wireless communications comprising the steps of:

in a first mode, establishing communications between a mobile station and a wireless system using code division multiple access (CDMA) signaling; and in a second mode, establishing communications between the mobile station and a wireline system, said step in said second mode comprising the substeps of:

establishing a wireless connection between the mobile station and a private base station using analog signaling by:

detecting a first available analog channel and a second available analog channel by measuring an up-link signal strength from another mobile station operating in the second mode within an area proximate to the base station, measuring a down-link signal strength from another base station operating proximate to the base station, in response to said steps of measuring, maintaining a list of available channels, transmitting control information from the base station to the mobile station via the first available analog channel to initiate a connection therebetween, and establishing a voice connection between the base station and the mobile station via the second available analog channel;

establishing a connection between the private base station and a wireline network; and exchanging information between the mobile station and the wireline network via the private base station.

2. A method of implementing wireless communications, said method comprising the steps of:

in a first mode, establishing communications between a mobile station and a wireless system using code division multiple access (CDMA) signaling; and in a second mode, establishing communications between the mobile station and a wireline system, said step in said second mode comprising the substeps of:

establishing a wireless connection for analog signaling between the mobile station and a private base station, said step for establishing a wireless connection comprising the substeps of:

detecting a first available analog channel and a second available analog channel by measuring an up-link signal strength from another mobile station operating in the second mode within an area proximate to the private base station, measuring a down-link signal strength from another base station operating proximate to the private base station, in response to said steps of measuring, maintaining a list of information identifying the first available analog channel and the second available analog channel, transmitting control information from the home base station to the mobile station via the first available analog channel to initiate a connection therebetween, and establishing a voice connection between the home base station and the mobile station via the second available analog channel;

establishing a connection between the private base station and a wireline system;

and exchanging information between the mobile station and the wireline system via the private base station.

3. A method of implementing wireless communications, said method comprising the steps of:

in a first mode, establishing communications between a mobile station and a wireless system using code division multiple access (CDMA) signaling;

in a second mode, establishing communications between the mobile station and a wireline system, said step in said second mode comprising the substeps of:

establishing a wireless connection for analog signaling between the mobile station and a private base station, said step for establishing a wireless connection comprising the substeps of:

detecting a first available analog channel and a second available analog channel by measuring an up-link signal strength from another mobile station operating in the second mode within an area proximate to the private base station, measuring a down-link signal strength from another base station operating proximate to the private base station, in response to said steps of measuring, maintaining a list of information identifying the first available analog channel and the second available analog channel, transmitting control information from the home base station to the mobile station via the first available analog channel to initiate a connection therebetween, and establishing a voice connection between the home base station and the mobile station via the second available analog channel;

establishing a connection between the private base station and a wireline system; and exchanging information between the mobile station and the wireline system via the private base station;

monitoring the strength of a signal transmitted from the home base station to the mobile station;

switching the mobile station from the second mode to the first mode when the strength of the signal transmitted from the home base station falls below a predetermined threshold;

registering a mobile identification number assigned to the mobile station with a selected home location register; and rerouting a call directed to the mobile identification number via the wireline network to the home base station when received by the home location register.

* * * * *